US012724630B2

(12) United States Patent
Liu et al.

(10) Patent No.: US 12,724,630 B2
(45) Date of Patent: Sep. 1, 2026

(54) DATA PROCESSING METHOD, DEVICE, AND APPARATUS, AND STORAGE MEDIUM

(71) Applicant: Lenovo (Beijing) Limited, Beijing (CN)

(72) Inventors: Bing Liu, Beijing (CN); Shuaiyi Zhang, Beijing (CN); Lei Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 656 days.

(21) Appl. No.: 18/121,491

(22) Filed: Mar. 14, 2023

(65) Prior Publication Data

US 2023/0359477 A1 Nov. 9, 2023

(30) Foreign Application Priority Data

May 7, 2022 (CN) ........................ 202210495319.0

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
CPC .................................................. G06F 9/45558
USPC ............................................................. 718/1
See application file for complete search history.

(56) References Cited

U.S. PATENT DOCUMENTS 9,965,357 B1 * 5/2018 Earl ...................... G06F 11/203
2018/0091625 A1 * 3/2018 Hwang ............... H04L 41/0897
2018/0276081 A1 * 9/2018 Zhang ................ G06F 11/1451
2020/0174814 A1 * 6/2020 Saxena ................ G06F 9/5077
2021/0263761 A1 * 8/2021 Tsirkin ............... G06F 9/45558
2021/0389964 A1 * 12/2021 Kelly ..................... G06N 20/00
2021/0406050 A1 * 12/2021 Huang ................. G06F 9/4856
2022/0066806 A1 * 3/2022 Ramanathan ....... G06F 9/45558
2022/0114080 A1 * 4/2022 Jackson .............. G06F 9/45558
2023/0036054 A1 * 2/2023 Williams ............... G06F 3/067
2023/0133439 A1 * 5/2023 Koren .................. G06F 12/109 711/118
2023/0244380 A1 * 8/2023 Lu ........................ G06F 3/0679 711/102
2023/0251799 A1 * 8/2023 Lee ....................... G06F 3/0647 711/154
2023/0359477 A1 * 11/2023 Liu ..................... G06F 9/45558

* cited by examiner

*Primary Examiner* — Mehran Kamran
(74) *Attorney, Agent, or Firm* — ANOVA LAW GROUP, PLLC

(57) ABSTRACT

A data processing method applied to a source virtual machine, the source virtual machine including a first virtual interface function abstract (VIFA) layer, the method includes obtaining target information of the source virtual machine based on the first VIFA layer, the target information including control plane information and data plane information; determining that a target virtual machine includes a second VIFA layer; establishing a virtual interface transfer relationship between the first VIFA layer and the second VIFA layer; and transmitting the target information to the target virtual machine based on the virtual interface transfer relationship.

19 Claims, 9 Drawing Sheets

DATA PROCESSING METHOD, DEVICE, AND APPARATUS, AND STORAGE MEDIUM

CROSS-REFERENCES TO RELATED APPLICATION

This application claims priority to Chinese Patent Application No. 202210495319.0 filed on May 7, 2022, the entire content of which is incorporated herein by reference.

FIELD OF TECHNOLOGY

The present disclosure relates to the field of data processing technology and, more specifically, to a data processing method, and device, and a storage medium.

BACKGROUND

With the continuous development of data processing technology, applications related to virtual machines have been actively developed. At present, there is a need to efficiently migrate virtual machines.

In the single-root I/O virtualization (SR-IOV) mode, devices can be directly passed to the virtual machine through the virtual high-speed serial computer expansion bus (e.g., a peripheral component interconnect express, PCIe), which has high network performance.

SR-IOV transfer data packets to the virtual machine through direct memory access (DMA), and DMA copies data from the virtual function (VF) module to the memory of the virtual machine by means of hardware input and output memory management unit (IOMMU).

This process is transparent to the virtual machine monitor (i.e., hypervisor). The hypervisor cannot sense that the information of the virtual machine (such as memory) has been modified, therefore, cannot support the hot migration of the virtual machine. In addition, the migration is often performed by replugging, which is inefficient.

SUMMARY

One aspect of the disclosure provides a data processing method applied to a source virtual machine. The source virtual machine includes a first virtual interface function abstract (VIFA) layer. The method includes obtaining target information of the source virtual machine based on the first VIFA layer. The target information includes control plane information and data plane information. The method also includes determining that a target virtual machine includes a second VIFA layer, establishing a virtual interface transfer relationship between the first VIFA layer and the second VIFA layer, and transmitting the target information to the target virtual machine based on the virtual interface transfer relationship.

Another aspect of the disclosure provides a data processing method applied to a target virtual machine. The target virtual machine includes a second VIFA layer. The method also includes determining that a source virtual machine includes a first VIFA layer, establishing a virtual interface transfer relationship between the first VIFA layer and the second VIFA layer, and receiving target information sent by the source virtual machine based on the virtual interface transfer relationship. The target information includes data plane information and control plane information.

Another aspect of the disclosure provides a data processing device deployed in a source virtual machine. The source virtual machine includes a first VIFA layer. The device includes an acquisition unit, configured to obtain target information of the source virtual machine based on the first VIFA layer. The target information includes control plane information and data plane information. The device also includes a first determination unit, configured to that a target virtual machine includes a second VIFA layer, a first establishing unit, configured to establish a virtual interface transfer relationship between the first VIFA layer and the second VIFA layer, and a first transmission unit, configured to transmit the target information to the target virtual machine based on the virtual interface transfer relationship.

Another aspect of the disclosure provides a data processing device deployed on a target virtual machine. The target virtual machine includes a second VIFA layer. The device includes a second determination unit, configured to determine that a source virtual machine includes a first VIFA layer, a second establishing unit, configured to establish a virtual interface transfer relationship between the first VIFA layer and the second VIFA layer, and a second transmission unit, configured to receive target information sent by the source virtual machine based on the virtual interface transfer relationship. The target information includes data plane information and control plane information.

Another aspect of the disclosure provides an electronic device including a one processor and a memory storing a computer program. When the computer program is being executed by the processor, the computer program causes the processor to obtain target information of a source virtual machine based on a first VIFA layer. The target information includes control plane information and data plane information. The computer program further causes the processor to determine that a target virtual machine includes a second VIFA layer, establish a virtual interface transfer relationship between the first VIFA layer and the second VIFA layer, and transmit the target information to the target virtual machine based on the virtual interface transfer relationship.

DETAILED DESCRIPTION

Figure 1:
FIG. 1 is a schematic structural diagram of a data processing system according to an embodiment of the present disclosure.
Figure 1:
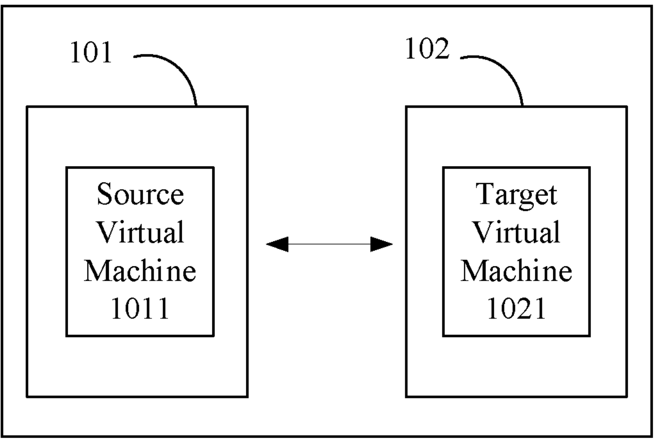

Hereinafter, aspects, features, and embodiments of the present disclosure will be described with reference to the accompanying drawings. Such description is illustrative only but is not intended to limit the scope of the present disclosure. In addition, it will be understood by those skilled in the art that various modifications in form and details may be made therein without departing from the spirit and scope of the present disclosure.

In the specification, terms such as "in one embodiment," "in another embodiment," "in an additional embodiment," or "in other embodiments" may all refer to one or more the same or different embodiments of the present disclosure, which can be combined with each other when there is no conflict.

In the following descriptions, the terms "first," "second," and "third" are merely intended to distinguish similar objects but does not necessarily indicate a specific order of an object. It may be understood that the terms "first," "second," and "third" are interchangeable in terms of a specific order or sequence if permitted, so that the embodiments of the present disclosure described herein can be implemented in a sequence in addition to the sequence shown or described herein. In the following description, the term "plurality" means at least two.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

Embodiments of the present disclosure provide a data processing method, device, and apparatus, and a storage medium. In practical applications, the data processing method may be implemented by a data processing device, and each functional entity in the data processing device may be realized by the hardware resources of an electronic device, such as computing resource (e.g., processors) and communication resources (e.g., to support optical cable and cellular communication).

The data processing provided by the embodiments of the present disclosure can be applied to a data processing system. The data processing system may include a source virtual machine and a target virtual machine.

The source virtual machine may include a first virtual interface function abstract (VIFA) layer, and the source virtual machine may be configured to obtain target information of the source virtual machine based on the first VIFA layer, the target information including control plane information and data plane information; determine that the target virtual machine includes a second VIFA layer; establish a virtual interface transfer relationship between the first VIFA layer and the second VIFA layer; and transmit the target information to the target virtual machine based on the virtual interface transfer relationship.

The target virtual machine may include a second VIFA layer, and the target virtual machine may be configured to determine that the source virtual machine includes the first VIFA layer; establish the virtual interface transfer relationship between the first VIFA layer and the second VIFA layer; and receive the target information sent by the source virtual machine based on the virtual interface transfer relationship, the target information including the data plane information and the control plane information.

It should be noted that the embodiments of the present disclosure do not limit the specific development manners of the source virtual machine and the target virtual machine, which can be configured based on actual needs.

In some embodiments, the source virtual machine and the target virtual machine may be integrated on the same electronic device. Correspondingly, the data processing method of the present disclosure can be used to migrate the target information of the source virtual machine on an electronic device to the target virtual machine on the electronic device.

In some embodiments, the source virtual machine and the target virtual machine may also be independently deployed on different electronic devices. Correspondingly, the data processing method of the present disclosure can be used to migrate the target information of the source virtual machine on one electronic device to the target virtual machine on another electronic device.

For example, the data processing system may be applied to the scenario shown in FIG. 1, and the data processing system may include a first device 101 and a second device 102, and the first device 101 may communicate with the second device 102.

A source virtual machine 1011 may be deployed on the first device 101, and the source virtual machine 1011 may include a first VIFA layer. Through the source virtual machine 1011, the first device 101 may be configured to obtain target information of the source virtual machine based on the first VIFA layer, the target information including control plane information and data plane information; determine that the target virtual machine includes a second VIFA layer; establish a virtual interface transfer relationship between the first VIFA layer and the second VIFA layer; and transmit the target information to the target virtual machine based on the virtual interface transfer relationship.

A target virtual machine 1021 may be deployed on the second device 102, and the target virtual machine 1021 may include a second VIFA layer. Through the target virtual machine 1021, the second device 102 may be configured to determine that the source virtual machine includes the first VIFA layer; establish the virtual interface transfer relationship between the first VIFA layer and the second VIFA layer; and receive the target information sent by the source virtual machine based on the virtual interface transfer relationship, the target information including the data plane information and the control plane information.

In some embodiments, the first device 101 and the second device 102 may be electronic devices with related data processing capabilities. For example, the first device 101 and the second device 102 may be servers.

It should be noted that the embodiments of the present disclosure do not limit the specific number of source virtual machines 1011 and target virtual machines 1021 in the data processing system, which can be configured based on specific scenario requirements. For example, the number of source virtual machine 1011 and target virtual machine 1021 may be one or more.

Various embodiments of the data processing method, device, and apparatus, and the storage medium provided in the present disclosure will be described below with reference to the schematic diagram of the data processing system in FIG. 1.

Embodiments of the present disclosure provide a data processing method, which can be applied to a data processing device. The data processing device may be deployed on the source virtual machine 1011 or the target virtual machine 1021 in FIG. 1. The data processing method provided by the embodiments of the present disclosure will be described below using the source virtual machine or target virtual machine as the execution subject.

Figure 2:
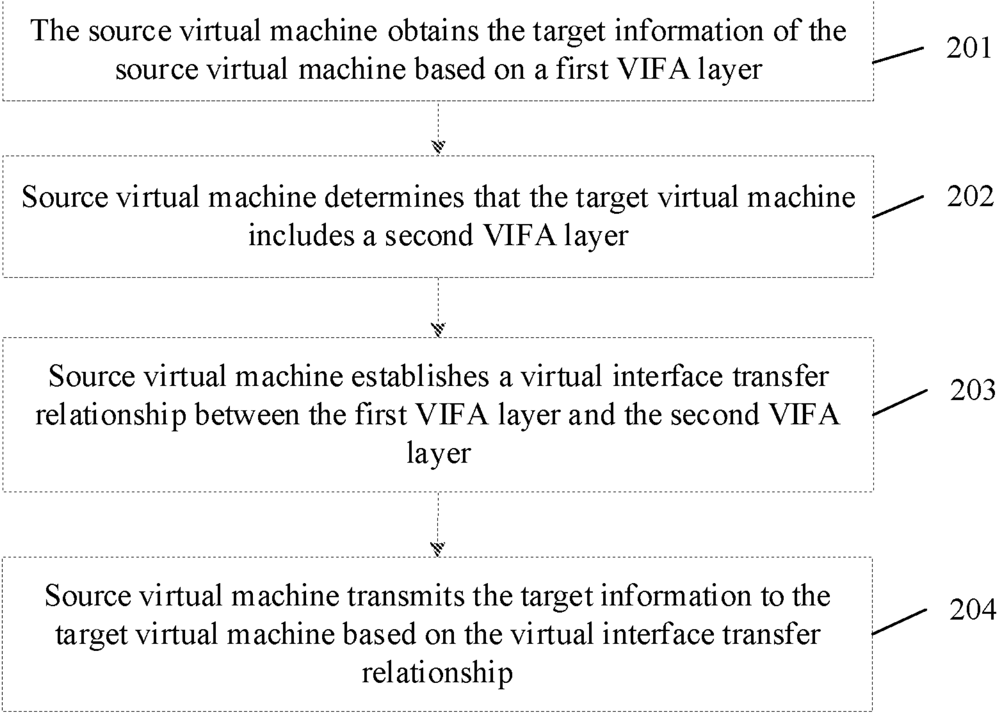
FIG. 2 is a flowchart of a data processing method according to an embodiment of the present disclosure.

FIG. 2 is a flowchart of a data processing method on the source virtual machine side. The data processing method may include, but is not limited to the processes shown in FIG. 2.

The embodiments of the present disclosure do not limit the number of source virtual machines, which can be configured based on actual requirements. In the following the data migration process will be described by taking the migration process of one virtual machine as an example.

If there are a plurality of source virtual machines to be migrated, the data migration process may be performed for each source virtual machine in the plurality of source virtual machines. The migration of the plurality of source virtual machines may be done in parallel or serially.

201, the source virtual machine obtains the target information of the source virtual machine based on the first VIFA layer.

In some embodiments, the source virtual machine may include a first virtual interface function abstract VIFA layer, and the source virtual machine may be a to-be-migrated virtual machine.

In some embodiments, the VIFA layer may be used to define how to obtain the to-be-migrated target information of the source virtual machine, how to migrate the target information, how to receive the target information, etc.

In some embodiments, the first VIFA layer may be the VIFA layer on the source virtual machine side, and may be used to define how to obtain the to-be-migrated target information of the source virtual machine.

The target information may include control plane information and data plane information. The control plane information may include, but is not limited to, various configuration information and state information of the source virtual machine, and the data plane information may include, but is not limited to, dirty page memory, etc.

The embodiments of the present disclosure do not limit the specific method for the source virtual machine to obtain the target information based on the first VIFA layer, which can be configured based on actual needs.

In some embodiments, the first VIFA layer may include an address record file and a resource abstraction structure, and the corresponding process at 201 may be as follow. The source virtual machine obtains the data plane information based on the address record file in the first VIFA layer, and the source virtual machine obtains the control plane information based on the resource abstraction structure in the first VIFA layer.

In some embodiments, the first VIFA layer may include at least two resource abstraction structures, and the corresponding process at 201 may be as follow. The source virtual machine obtains the data plane information based on one resource abstraction structure in the first VIFA layer, and the source virtual machine obtains the control plane information based on the other resource abstraction structure in the first VIFA layer.

202, the source virtual machine determines that the target virtual machine includes a second VIFA layer.

In some embodiments, the second VIFA layer may be the VIFA layer on the target virtual machine side.

The embodiments of the present disclosure do not limit the method of determining whether the target virtual machine includes the second VIFA layer, which can be configured based on actual needs. For example, the determination may be performed on the source virtual machine side, or the determination may be performed on the target virtual machine side.

In some embodiments, the source virtual machine may send a detection request to the target virtual machine, and the detection request may be used to instruct the target virtual machine to detect whether the second VIFA layer is included. After receiving the detection request, the target virtual machine may detect whether the second VIFA layer is included based on the indication of the detection request. When it is determined that the second VIFA layer is included, the target virtual machine may send a detection response to the source virtual machine, and when the source virtual machine receives the detection response, it may determine that the target virtual machine includes the second VIFA layer.

It should be noted that if the source virtual machine does not receive the detection response, the source virtual machine may determine that the target virtual machine does not include the second VIFA layer. In this case, the target information cannot be migrated through the data processing method provided by the embodiments of the present disclosure.

In some embodiments, the source virtual machine may determine whether the target virtual machine includes the second VIFA layer by detecting whether the target virtual machine includes the content of the second VIFA layer (the resource abstraction structure, the address record file, etc.). Alternatively, the source virtual machine may determine whether the target virtual machine includes the second VIFA layer by detecting whether the target virtual machine includes a function corresponding to the second VIFA layer.

203, the source virtual machine establishes a virtual interface transfer relationship between the first VIFA layer and the second VIFA layer.

In some embodiments, the VIFA layer may also be used to define the virtual interface transfer relationship, such that the target information can be transmitted to the target virtual machine through the virtual interface transfer relationship.

The embodiments of the present disclosure do not limit the number of specific virtual interface transfer relationships, which can be configured based on actual needs.

In some embodiments, the process at 203 may be implemented as follow. The source virtual machine establishes a virtual interface transfer relationship between the first VIFA layer and the second VIFA layer, such that the control plane information and the data plane information can be transmitted through the virtual interface transfer relationship.

In some embodiments, the process at 203 may also be implemented as follow. The source virtual machine establishes two virtual interface transfer relationships between the first VIFA layer and the second VIFA layer, such that the control plane information can be transmitted through the one virtual interface transfer relationship, and the data plane information can be transmitted through the other virtual interface transfer relationship.

The embodiments of the present disclosure do not limit the specific method of establishing the virtual interface transfer relationship, which can be configured based on actual needs. For example, the virtual interface transfer relationship may be defined by a table or other corresponding relationship.

For example, the virtual interface transfer relationship may include a virtual interface 1 and a virtual interface 2. The virtual interface 1 may be the virtual interface in the first VIFA layer and the virtual interface 2 may be the virtual interface in the second VIFA layer. A comma may be used to indicate the data transmission direction between the virtual interfaces, that is virtual interface 1 may be used as the data output party, and the virtual interface 2 may be used as the data receiver.

204, the source virtual machine transmits the target information to the target virtual machine based on the virtual interface transfer relationship.

In some embodiments, if the number of virtual interface transfer relationship is one, the process at 204 may be implemented as follow: the source virtual machine transmits the target information to the target virtual machine based on the virtual interface transfer relationship.

In some embodiments, if the number of virtual interface transfer relationship is two, the process at 204 may be implemented as follow: the source virtual machine transmits the data plane information to the target virtual machine based on one virtual interface transfer relationship, and transmit the control plane information to the target virtual machine based the other virtual interface transfer relationship.

More specifically, the process of the source virtual machine transmitting the target information to the target virtual machine based on the virtual interface transfer relationship may include: the source virtual machine determining the data output interface of the target information and receiving interface of the target information based on the virtual interface transfer relationship, then outputting the target information from the output interface to the receiving interface. In some embodiments, the output interface and the receiving input may both be virtual interfaces.

It can be understood that the number of virtual interface transfer relationships may also be set as N, where N is a value greater than two. Correspondingly, the target information may be divided into N types of information, and then each type of information in the N types of information may be transmitted to the target virtual machine through the virtual interface transfer relationship.

Embodiments of the present disclosure provides a data processing method that can be applied to a source virtual machine. The source virtual machine may include a first VIFA layer. The method includes obtaining the target information of the source virtual machine based on the first VIFA layer, the target information including control plane information and data plane information; determining that the target virtual machine includes a second VIFA layer; establishing a virtual interface transfer relationship between the first VIFA layer and the second VIFA layer; and transmitting the target information to the target virtual machine based on the virtual interface transfer relationship. For the technical solution of the present disclosure, the first VIFA layer may be configured on the source virtual machine. The target virtual machine may also include a second VIFA layer. The target information (the control plane information and the data plane information) of the source virtual machine may be obtained through the first VIFA layer, and then the target information may be transmitted to the target virtual machine through the virtual interface transfer relationship between the first VIFA layer and the second VIFA layer. In this way, on one hand, the target information of the source virtual machine can be obtained based on the first VIFA layer, which improves the awareness of the target information, hot migration is supported, and the migration efficiency is high; on the other hand, the target information cab be transmitted to the target virtual machine through the virtual interface transfer relationship between the first VIFA layer and the second VIFA layer. In this way, when migrating the data of the source virtual machine, there is no need to plug and unplug the device, hot migration is supported, and the migration efficiency is high.

Next, the process of establishing the virtual interface transfer relationship between the first VIFA layer and the second VIFA layer by the source virtual machine in the process at 203 will be described. This process may include, but is not limited to the following cases.

In the case of A1, one virtual interface transfer relationship may be established between the first VIFA layer and the second VIFA layer.

In the case of B1, two virtual interface transfer relationships may be established between the first VIFA layer and the second VIFA layer.

Next, the process of establishing one virtual interface transfer relationship between the first VIFA layer and the second VIFA layer in the case of A1 will be described.

In the case of A1, the source virtual machine may determine a virtual interface in a plurality of virtual interfaces included in the first VIFA layer as the virtual interface for outputting the target information, and determine a virtual interface in a plurality of virtual interfaces included in the second VIFA layer as the virtual interface for receiving the target information. Subsequently, based on the format of the virtual interface transfer relationship, the transfer relationship between the virtual interface outputting the target information and the virtual interface receiving the target information may be established.

In some embodiments, the source virtual machine may determine the virtual interface in the plurality of virtual interfaces included in the second VIFA layer as the virtual interface for receiving the target information, or the target virtual machine may determine the virtual interface and then inform the source virtual machine.

Next, the process of establishing two virtual interface transfer relationships between the first VIFA layer and the second VIFA layer in the case of B1 will be described.

In some embodiments, the first VIFA layer may include a first virtual interface and a second virtual interface transfer relationship, and the second VIFA layer may include a third virtual interface and a fourth virtual interface.

The embodiments of the present disclosure do not limit the specific type of the virtual interface, which can be configured based on actual needs. For example, the virtual interface may be a high-speed serial computer expansion bus (e.g., a peripheral component interconnect express, PCIe) type of virtual interface.

Figure 3:
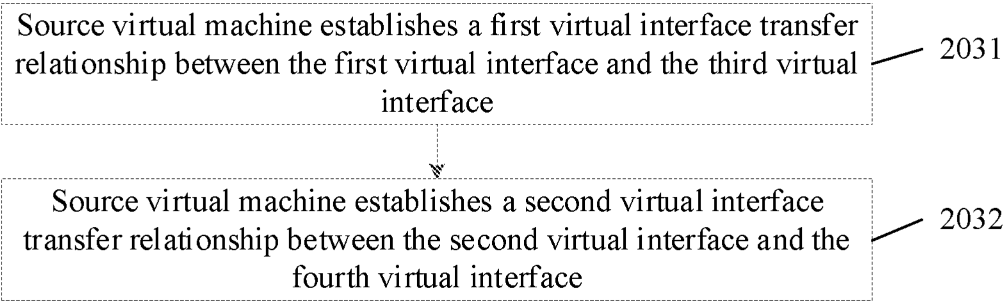
FIG. 3 is a flowchart of the data processing method according to an embodiment of the present disclosure.

In some embodiments, the case of B1 may include, but is not limited to the processes shown in FIG. 3.

2031, the source virtual machine establishes a first virtual interface transfer relationship between the first virtual interface and the third virtual interface.

For example, when the virtual interface transfer relationship is in a table format, the process at 2031 may be implemented as follow: the source virtual machine using the first virtual interface as the data output interface and the third virtual interface as the data receiving interface, and establishing the first virtual interface transfer relationship between the data output interface and the data receiving interface.

For example, the virtual interface transfer relationship may be as shown in Table 1.

TABLE 1

| Example of the virtual interface transfer relationship | | |
|---|---|---|
| Virtual Interface Transfer Relationship | First Virtual Interface Transfer Relationship | . . . |
| Data Output Interface | First Virtual Interface | . . . |
| Data Receiving Interface | Third Virtual Interface | . . . |

2032, the source virtual machine establishes a second virtual interface transfer relationship between the second virtual interface and the fourth virtual interface.

For example, when the virtual interface transfer relationship is in a table format, the process at 2032 may be implemented as follow: the source virtual machine using the second virtual interface as the data output interface and the fourth virtual interface as the data receiving interface, and establishing the second virtual interface transfer relationship between the data output interface and the data receiving interface.

For example, the virtual interface transfer relationship may be as shown in Table 1.

TABLE 2

| Example of the virtual interface transfer relationship | | | |
|---|---|---|---|
| Virtual Interface Transfer Relationship | First Virtual Interface Transfer Relationship | Second Virtual Interface Transfer Relationship | . . . |
| Data Output Interface | First Virtual Interface | Second Virtual Interface | . . . |
| Data Receiving Interface | Third Virtual Interface | Fourth Virtual Interface | . . . |

Compared with the case of B1, the case of A1 is simple to implement and has high transmission efficiency. Compared with the case of A1, the case of B1 can distinguish control plane information from data plane information, and can directly determine the type of received information on the target virtual machine side, and reduce the data configuration time after receiving the data.

Next, the process at 204 where the source virtual machine transmits the target information to the target virtual machine based on the virtual interface transfer relationship will be described.

Corresponding to the case of A1 and the case of B1 in the process at 203, the process at 204 may include, but is not limited to, the following cases A2 and B2.

In the case of A2, the target information may be transmitted based on one virtual interface transfer relationship.

In the case of B2, the target information may be transmitted based on two virtual interface transfer relationships.

In the case of A2, the source virtual machine may transmit the target information to the target virtual machine based on one virtual interface transfer relationship.

Next, the case of B2 where the source virtual machine transmits the target information based on two virtual interface transfer relationships will be described.

Figure 4:
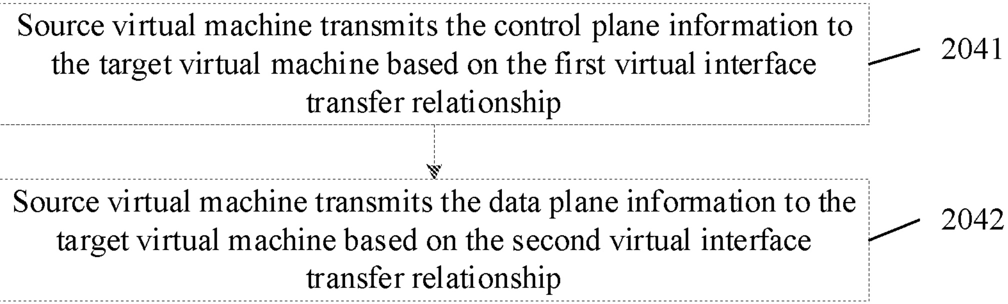
FIG. 4 is a flowchart of the data processing method according to an embodiment of the present disclosure.
Figure 5:
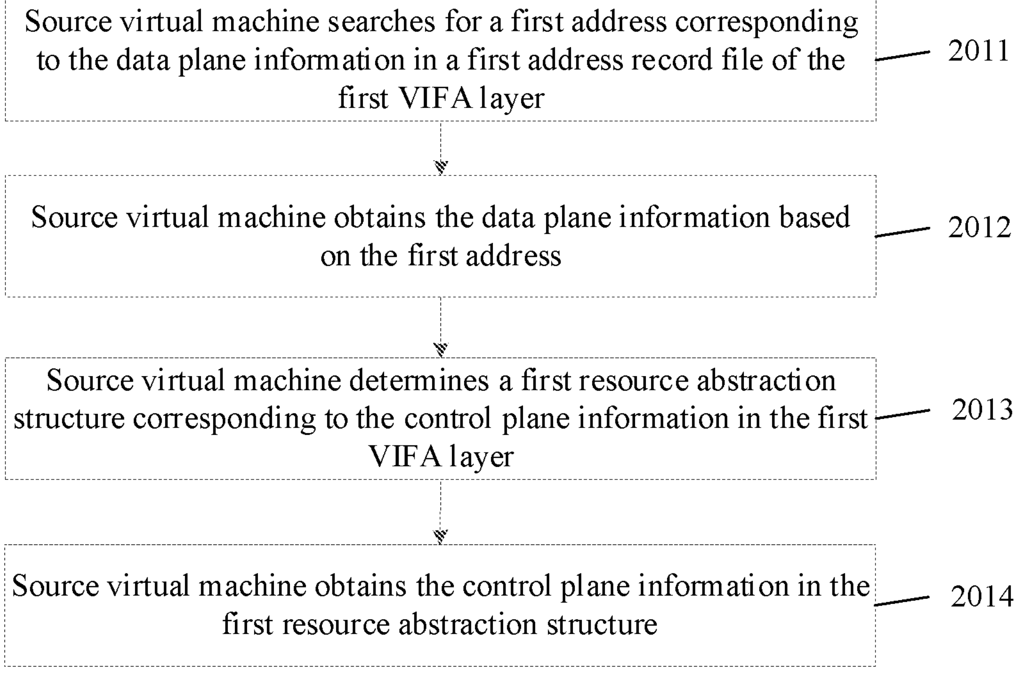
FIG. 5 is a flowchart of the data processing method according to an embodiment of the present disclosure.

As shown in FIG. 4, the case of B2 may include, but is not limited, to the following processes.

2041, the source virtual machine transmits the control plane information to the target virtual machine based on the first virtual interface transfer relationship.

In some embodiments, the first virtual interface transfer relationship may be virtual interface used to transmit the control plane information.

2042, the source virtual machine transmits the data plane information to the target virtual machine based on the second virtual interface transfer relationship.

In some embodiments, the second virtual interface transfer relationship may be a virtual interface used to transmit the data plane information.

Compared with the case of B2, the case of A2 is simple to implement and the transmission efficiency is high. Compared with the case of A2, the case of B2 can distinguish the control plane information from the data plane information, and the type of information received can be directly determined on the target virtual machine side, which reduces the data configuration time after receiving the data.

Next, the process of the source virtual machine obtaining its target information based on the first VIFA layer in the process at 201 will be described.

As shown in FIG. 4, the process may include, but is not limited, to the following processes.

2011, the source virtual machine searches for a first address corresponding to the data plane information in a first address record file of the first VIFA layer.

In some embodiments, the storage address of the data plane information may be recorded in the first address record file.

The process at 2011 may be implemented as the source virtual machine searching for the first address record file in the first VIFA layer, and searching for the first address corresponding to the data plane information in the first address record file.

In some embodiments, the first address corresponding to the data plane information may be one piece of address information, or may be multiple pieces of address information.

2012, the source virtual machine obtains the data plane information based on the first address.

The process at 2012 may be implemented as the source virtual machine searching the physical storage disk for the sored data under the first address to obtain the data plane information.

2013, the source virtual machine determines a first resource abstraction structure corresponding to the control plane information in the first VIFA layer.

In some embodiments, the resource abstraction structure may be used to store control plane information. If the storage space allows, the resource abstraction structure may also be used to store data plane information.

In some embodiments, the first resource abstraction structure may be used store control plane information.

The process at 2013 may be implemented as the source virtual machine searching the resource abstraction structure in the first VIFA layer, and determining the first resource abstraction structure storing the control plane information in the resource abstraction structure.

2014, the source virtual machine obtains the control plane information in the first resource abstraction structure.

The process at 2014 may be implemented as the source virtual machine using the content stored in the first resource abstraction structure as the control plane information.

Figures 6, 7:
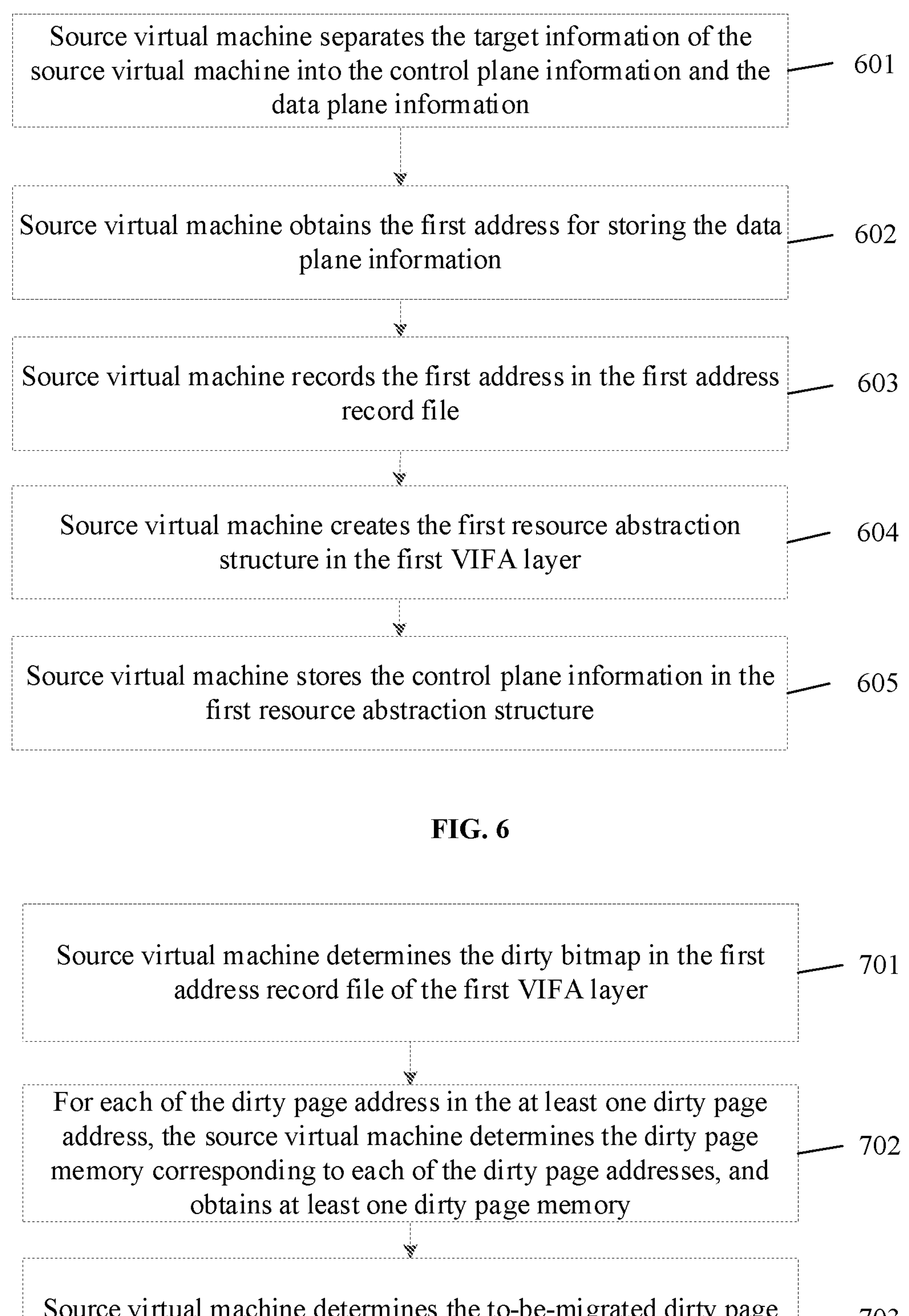
FIG. 6 is a flowchart of the data processing method according to an embodiment of the present disclosure.
FIG. 7 is a flowchart of the data processing method according to an embodiment of the present disclosure.

The data processing method provided by the embodiments of the present disclosure, before performing the process at 201, the source virtual machine obtaining its target information based on the first VIFA layer, may include, but is not limited to the following processes shown in FIG. 6.

601, the source virtual machine separates the target information of the source virtual machine into the control plane information and the data plane information.

The process at 601 may be implemented as the source virtual machine separating the control plane information and the state information from the target information of the source virtual machine as the control plane information, and use other information (such as dirty page memory) as data plane information.

602, the source virtual machine obtains the first address for storing the data plane information.

The process at 602 may be implemented as the source virtual machine obtaining the address information storing the data plane information, and using the address information as the first address.

In some embodiments, the first address may be one piece of address information or multiple pieces of address information.

603, the source virtual machine records the first address in the first address record file.

The process at 603 may be implemented as the source virtual machine recording the first address in the first address record file, such that the data plane information can be found through the first address.

604, the source virtual machine creates the first resource abstraction structure in the first VIFA layer.

The process at 604 may be implemented as the source virtual machine creating the first resource abstraction structure in the first VIFA layer, and configuring the first resource abstraction structure to store the control plane information.

605, the source virtual machine stores the control plane information in the first resource abstraction structure.

In practice, the data volume of the control plane information may be relatively small, therefore, the control plane information can be directly stored in the resource abstraction structure, and the data volume of the data plane information may be relatively large, therefore, the first address of the data plane information may be stored in the first address file, and the data plane information may be found through the first address. In this way, during the migration, the target information can be quickly and accurately obtained, which improves the efficiency of the migration.

In some embodiments, when the data plane information includes to-be-migrated dirty page memory, the process at 201, the source virtual machine obtaining its target information based on the first VIFA layer, may include, but is not limited to the following processes shown in FIG. 7.

701, the source virtual machine determines the dirty bitmap in the first address record file of the first VIFA layer.

In some embodiments, the dirty bitmap may include at least one dirty page address and dirty page memory corresponding to each dirty page address in the at least one dirty page address.

The process at 701 may be implemented as the source virtual machine finding the address for storing the dirty bitmap in the first address record file of the first VIFA layer, thereby obtaining the dirty bitmap based on the address for storing the dirty bitmap.

702, for each of the dirty page address in the at least one dirty page address, the source virtual machine determines the dirty page memory corresponding to each of the dirty page addresses, and obtains at least one dirty page memory.

The process at 702 may be implemented as, for each dirty page address in the at least one dirty page address included in the dirty bitmap, the source virtual machine obtaining the dirty page memory under the dirty page address through the dirty page address, thereby obtaining at least one dirty page memory.

703, the source virtual machine determines the to-be-migrated dirty page memory is the at least one dirty page memory.

In related technologies, dirty page memory cannot be sensed. In the present disclosure, the address of the dirty bitmap is recorded is recorded in the first address record file of the first VIFA layer. The dirty bitmap includes the address of the dirty page, such that he dirty page memory can be obtained.

Figure 8:
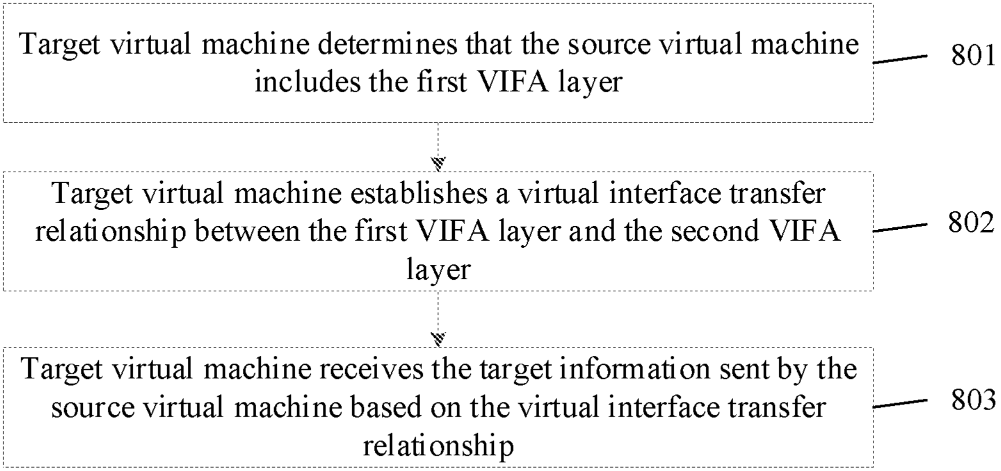
FIG. 8 is a flowchart of the data processing method according to an embodiment of the present disclosure.

FIG. 8 is a flowchart of the data processing method on the target virtual machine side. The data processing method may include, but is not limited to the processes shown in FIG. 8.

In some embodiments, the target virtual machine may include a second VIFA layer, and the second VIFA layer may be a VIFA layer on the target virtual machine side.

801, the target virtual machine determines that the source virtual machine includes the first VIFA layer.

For the implementation of the process at 801, reference can be made to the description of the process at 202 where the source virtual machine determines that the target virtual machine includes the second VIFA layer, which will not be repeated here.

802, the target virtual machine establishes a virtual interface transfer relationship between the first VIFA layer and the second VIFA layer.

For the implementation of the process at 802, reference can be made to the description of the process at 203 where the source virtual machine establishes the virtual interface transfer relationship between the first VIFA layer and the second VIFA layer, which will not be repeated here.

It should be noted that the virtual interface transfer relationship established on the target virtual machine side should be consistent with the virtual interface transfer relationship established on the source virtual machine side. For example, after the virtual interface transfer relationship is established on the source virtual machine side, the virtual interface transfer relationship may be transmitted to the target virtual machine side, and the target virtual machine side may establish the virtual interface transfer relationship on the target virtual machine side based on the received virtual interface transfer relationship.

803, the target virtual machine receives the target information sent by the source virtual machine based on the virtual interface transfer relationship.

In some embodiments, the target information may include the data plane information and the control plane information.

The target virtual machine may be configured to determine the output interface and the receiving interface of the target information based on the virtual interface transfer relationship. The target information transmitted by the output interface may be received through the receiving interface. For other implementation processes, reference can be made to the description of the process at 204 where the source virtual machine transmits the target information to the target virtual machine based on the virtual interface transfer relationship, which will not be repeated here.

For the technical solution of the present disclosure, the first VIFA layer may be configured on the source virtual machine, the target virtual machine may also include a second VIFA layer, and the target information may be transmitted to the target virtual machine through the virtual interface transfer relationship between the first VIFA layer and the second VIFA layer. In this way, the target information can be transmitted to the target virtual machine through the virtual interface transfer relationship between the first VIFA layer and the second VIFA layer. Therefore, when migrating the data of the source virtual machine, there is no need to plug and unplug the device, hot migration is supported, and the migration efficiency is high.

Figure 9:
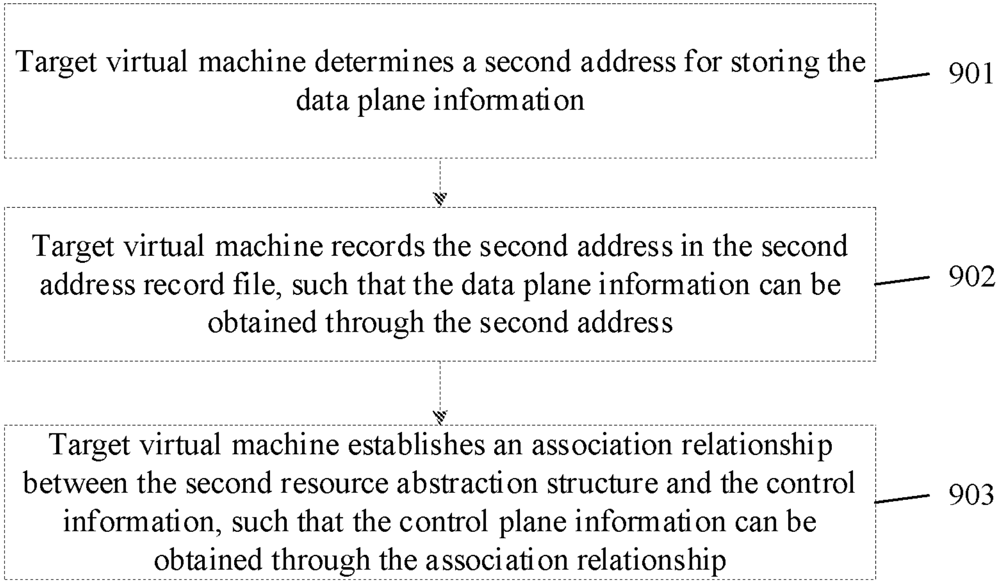
FIG. 9 is a flowchart of the data processing method according to an embodiment of the present disclosure.

The data processing method provided by the embodiments of the present disclosure may also be used to automatically configure information on the target virtual machine side after the target information is received. More specifically, the process may include, but is not limited to the processes shown in FIG. 9.

In some embodiments, the second VIFA layer may include a second address record file and a second resource abstraction structure. The second address record file may be a file on the target virtual machine side that records the storage address of the data plane information, and the second resource abstraction structure may be a structure for storing control plane information on the target virtual machine side.

901, the target virtual machine determines a second address for storing the data plane information.

The process at 604 may be implemented as the target virtual machine determining the second address for storing the data plane information in the target information.

In some embodiments, the second address may be a storage address of the data plane information on the target virtual machine side. The second address may be one piece of address information or multiple pieces of address information.

902, the target virtual machine records the second address in the second address record file, such that the data plane information can be obtained through the second address.

The process at 604 may be implemented as the target virtual machine recording the second address in the second address record file, such that the target virtual machine can obtain the data plane information through the second address.

903, the target virtual machine establishes an association relationship between the second resource abstraction structure and the control plane information, such that the control plane information can be obtained through the association relationship.

In this way, after receiving the target information, the target virtual machine side can directly store the second address storing the data plane information in the second address record file, and establish the association relationship between the second resource abstraction structure and the control plane information, such that the target information can be directly obtained through the second address and the association relationship. That is, the migration information of the source virtual machine can be obtained, thereby saving a manual configuration process and improving migration efficiency.

In the following, the data processing method provided by the embodiments of the present disclosure will be described by taking the complete process of virtual machine migration as an example.

In practice, multiple virtual PCIs can be created in the SR-IOV mode, and devices can be directly passthrough to virtual machines through the multiple virtual PCIs, such that a higher network performance can be achieved.

However, the disadvantage of the process described above is that virtual machine hot migration cannot be properly supported. In the process described above, SR-IOV is used to transfer data packets to the virtual machine through DMA, and DMA copies data from the virtual function (VF) module to the memory of the virtual machine by means of hardware IOMMU. This process is transparent to the virtual machine monitor (e.g., the hypervisor). The hypervisor cannot sense which memory of the virtual machine has been modified. Therefore, during hot migration, these memory modifications cannot be synchronized in time, resulting in packet loss.

During the migration process, the target virtual machine will create a new VF, but the VF driver inside the target virtual machine still saves the state information of the previous source host VF, such that the hypervisor must allow the target virtual machine to access the new VF device and synchronize the state between the guest VF driver and the new VF.

Related technologies include the following two approaches when migrating a virtual machine.

In the first approach, a bond may be established between a para-virtualized device and an SR-IOV device. In general forwarding scenarios, the SR-IOV device may be used for transmission. During hot migration, the process may be switched to the para-virtualized device, and the hot migration may be performed in the virtual machine operating system (e.g., GuestOS) through the bond.

In the first approach, the hot migration through the bond ahs a long transmission path. When the virtual machine (VM) is relatively large, the migration time will be relatively long, the performance will fluctuate greatly, and the management is complicated.

In addition, if the application in the virtual machine adopts the data plane development kit (DPDK), the user-mode-based poll mode driver (PMD) based on the DPDK can only take over a certain type of device (SR-IOV direct VF device or para-virtualized device), the bond device cannot be supported.

In the second approach, a passthrough may be used for migration. This approach cannot support the virtual machine hot migration technology in the SR-IOV environment with pure software, and require manual plugging and reconfiguration of the Internet protocol (IP) address. More specifically, this approach includes detaching the network card, attaching the network card after migration on the opposite side, and obtaining the IP address again.

The second approach requires manual plugging and unplugging, and the IP address needs to be reconfigured, which affects the network connection, resulting in hot migration failure.

In view of the foregoing, embodiments of the present disclosure provide a data processing method, which can be applied to a data processing system and used to implement hot migration of an SR-IOV virtual machine.

Figure 10:
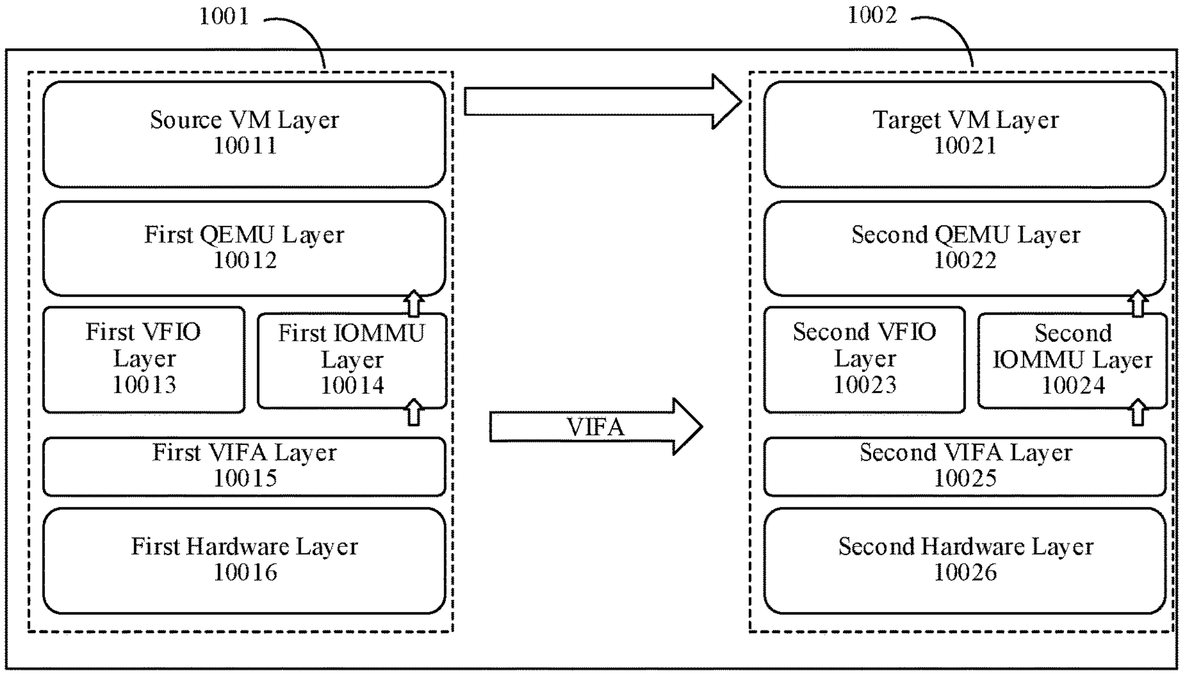
FIG. 10 is a schematic structural diagram of the data processing system according to an embodiment of the present disclosure.

FIG. 10 is a schematic structural diagram of the data processing system according to an embodiment of the present disclosure. As shown in FIG. 10, the data processing system includes a source virtual machine side 1001 and a target virtual machine side on the source virtual machine side 1002.

The source virtual machine side 1001 includes a source virtual machine (source VM) layer 10011, a first virtual operating system emulator (a quick EMUlator, QEMU) layer 10012, a first virtual function input/output (VFIO) layer 10013, a first IOMMU layer 10014, a first virtual interface function abstraction (VIFA) layer 10015, and a first hardware layer 10016.

The target virtual machine layer 1002 on the source virtual machine side may include a source virtual machine side target virtual machine (target VM) layer 10021, a source virtual machine side second virtual operating system emulator (a quick EMUlator, QEMU) layer 10022, a source virtual machine side second virtual function input/output (VFIO) layer 10023, a source virtual machine side second IOMMU layer 10024, a source virtual machine side second virtual interface function abstraction (VIFA) layer 10025, and a source virtual machine side second hardware layer 10026.

It should be noted that the VIFA layers (e.g., the first VIFA layer and the second VIFA layer) may be newly added in the embodiments of the present disclosure.

The source VM layer 10011 and the source virtual machine side target VM layer 1002 may belong to the virtual machine layer. In the embodiments of the present disclosure, the source VM layer 10011 may belong to the source virtual machine side, and the source virtual machine side target VM layer 10021 may belong to the target virtual machine side. In the embodiments of the present disclosure, the data plane information of the source VM layer 10011 may be hot migrated to the relevant position of the source virtual machine side target VM layer 10021.

The first QEMU layer 10012 and the source virtual machine side second QEMU layer 10022 may belong to the analog processor software, which can be used to simulate computer systems including CPU and peripheral equipment.

The first VFIO layer 10013 and the source virtual machine side second VFIO layer 10023 may belong to the user mode driver framework and may be used to expose device information to the user space.

The first IOMMU layer 10014 and the source virtual machine side second IOMMU layer 10024 may belong to the memory management unit and may be used for addressing in the virtual memory.

The first VIFA layer 10015 and the source virtual machine side second VIFA layer 10025 may belong to the address virtualization layer and may be used for hot migration of virtual machines in the SR-IOV environment.

The first hardware layer 10016 and the source virtual machine side second hardware layer 10026 may belong to the physical layer and may be used to store and transmit data.

It should be noted that the random-access memory (RAM) needs to set the dirty page state to perform migration, and "Dirty RAM to dst" means that the dirty memory is transferred to the destination.

In some embodiments, before the migration is complete, the state information of the device may need to be migrated first, and then the remaining memory data may be migrated.

In some embodiments, the VIFA may not only send device state information, but also transmit hardware virtualization input/output interfaces, such as high-speed serial computer expansion buses (e.g., a peripheral component interconnect express, PCIe) and memory data.

The VIFA may abstract the PCIe (also referred to as PCI) information and hardware device state of hardware devices, and store the PCI information and the state of hardware devices in the virtual device structure. The hypervisor may not directly obtain device transparent transmission information from the hardware PCI information and the hardware platform, but may be modified to obtain the device transparent transmission information from the virtual device structure.

Compared to the related technologies, which only supports obtaining transparent transmission information from standard hardware PCI and hardware platform devices, the embodiments of the present disclosure have extended on the VFIO kernel frame to increase a VIFA layer (also referred to as VIFA device) and the support to virtual devices such as VIFA. For example, the based address storage (e.g., PCI bar) space may not only be obtained directly from the hardware device, but also obtained from the virtual device interface of the VIFA device.

In some embodiments, the VIFA may use the VFIO framework to build a VIFA virtual device, map the VFIO area to device resources (e.g., a memory-mapped I/O, MMIO, a PCI configuration space, etc.), register a new VFIO extension area VIFA for device context transfer, and control the running state of the device.

In some embodiments, the region setup configured by the PCI in the VFIO frame may be captured by QEMU. On the target virtual machine side, QEMU may need to go through the same PCI configuration region to build device resource maps and virtual interrupt injection patches. The memory map may be queried from the VFIO IOMMU driver to build a dirty bitmap, and the VIFA driver may create a shadow list for DMA operations, which can track visitor pages for DMA and build a dirty bitmap for migration.

In some embodiments, the dirty bitmap may include memory dirty page addresses, which can be used to mark the migrated memory.

In some embodiments, the function of the shadow list may be to track the memory updated by the DMA, and the content may be the updated memory address.

In some embodiments, the VIFA driver may pin the memory for DMA use at runtime. These mappings may be tracked by the VFIO IOMMU driver. During the migration process, QEMU may query the mapping from the VFIO IOMU driver and build a dirty bitmap to transfer the DMA memory used by VIFA to address the dirty page tracking need.

Since VIFA is registered in the VFIO framework, when the DMA updates the memory, the change can be sensed by the callback function through VIFA.

Embodiment of the present disclosure have the following technical effects. On one hand, through the para-virtualization migration method, data transmission is still transmitted through DMA, which ensures the high performance of the migration, and at the same time offsets performance loss caused by the introduction of the virtualization layer. On the other hand, copying data through DMA saves the virtualization process and further improves the migration efficiency. Further, VFIO is extended to support migration through hardware virtualization I/O, which expands the migration scenarios.

Embodiment of the present disclosure have the following characteristics:

1. A VIFA is added to support hot migration of virtual machines without losing hardware performance.
2. A bus driver unit (BDU) is designed in the VIFA, and the feature (e.g., ring) address information stored in the VF device register can be obtained through the virtual memory (e.g., page file, PF) driver to improve the efficiency and accuracy of dirty page tracking.

In some embodiments, the ring address information may include the mapping relationship between address information and memory. In this way, the modified address memory can be obtained through the ring address information. Therefore, when determining the address information corresponding to the memory, index complexity can be reduced to improve efficiency.

3. An interface abstraction unit (IAU) is designed in the VIFA to obtain the abstraction of the underlying hardware device, abstract the driver implementation details related to the physical device, and design the resource abstraction structure to improve the migration flexibility.

Next, the hot migration process will be described in detail.

Figure 11:
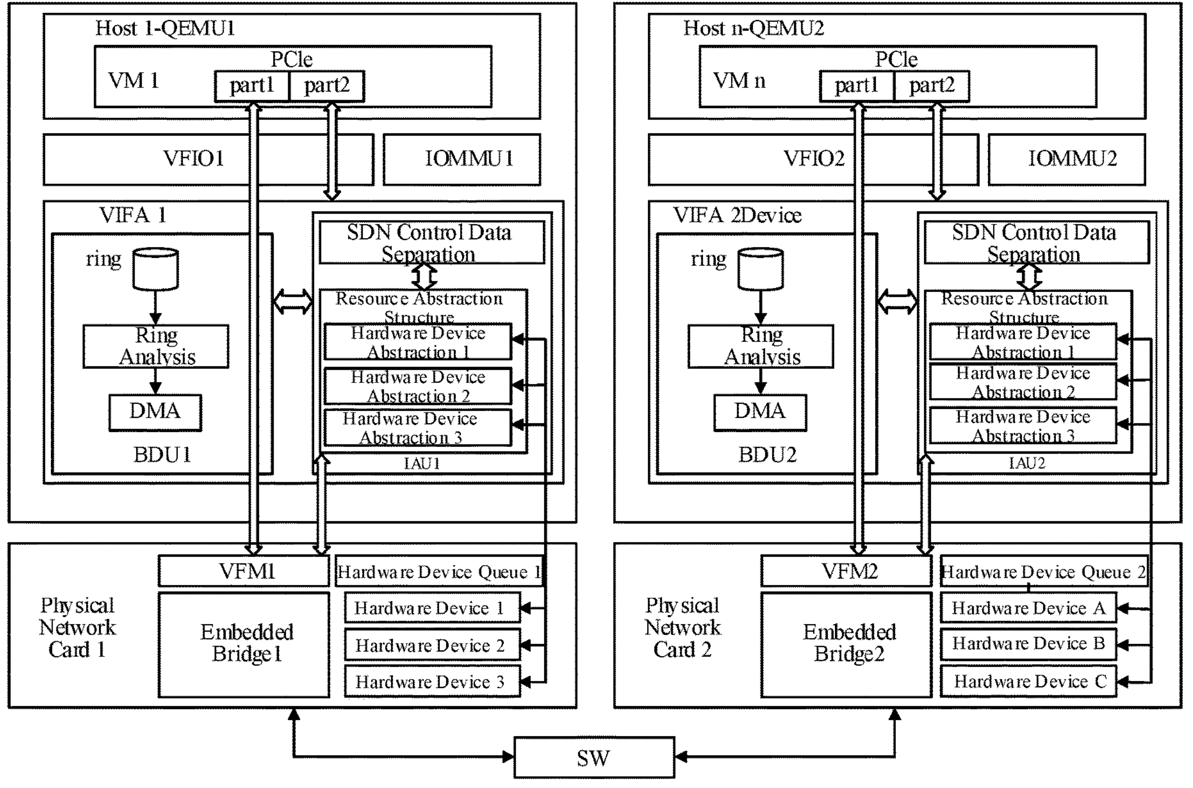
FIG. 11 is a schematic structural diagram of the data processing system according to an embodiment of the present disclosure.

As shown in FIG. 11, the VIFA includes two modular units, namely, a bus driver unit (BDU) and an interface abstraction unit (IAU).

The BDU module may be configured to obtain the ring address information stored in the VF device register through the PF driver to obtain the specific entry information, and then track the dirty page memory. The BDU may obtain information such as the start address and length of the to-be-stored memory data in the VF register through the PF driver.

The IAU may be configured to obtain the abstraction of the underlying hardware devices, strips and abstracts the driver implementation details related to the physical devices (i.e., separates the control data), and use the resource abstraction structure to store the state information of these hardware devices, which is convenient for the BDU to schedule.

For example, assume that data on VM 1 on Host 1 needs to be hot migrated to VM n on Host n.

As shown in FIG. 11, Host 1 includes QEMU1, VIFO1, IOMMU1, VIFA1, and a physical network card 1, and Host n includes QEMU2, VIFO2, IOMMU2, VIFA2, and a physical network card 2. Host 1 and Host n may transmit information through a switch (SW).

Host 1 and Host n may respectively divide PCIe into a first part (part1) and a second part (part2), such that the data plane information on VM 1 can be migrated through part1, and the control plane information on VM 1 can be migrated through part2.

The VIFA1 includes BDU1 and IAU1, and VIFA2 includes BDU2 and IAU2.

The physical network card 1 includes a virtual file manager (VFM) 1, an embedded bridge 1, and a hardware device queue 1. The hardware device queue 1 includes a hardware device 1, a hardware device 2, and a hardware device 3.

The physical network card 2 includes a virtual file manager (VFM) 2, an embedded bridge 2, and a hardware device queue 2. The hardware device queue 2 includes a hardware device A, a hardware device B, and a hardware device C.

BDU1 and BDU2 may be used for ring analysis to obtain the to-be-migrated address information, and perform data hot migration through DMA. IAU1 and IAU2 may be used to separate the control data and store the control data in the resource abstraction structure. For example, in IAU1, the resource abstraction structure may include the hardware abstraction 1, hardware abstraction 2, and hardware abstraction 3. Hardware abstraction 1, hardware abstraction 2, and hardware abstraction 3 may be used to store control data in different hardware devices.

The VM hot migration pre-process will be described below.

1. VIFA modules are added on the source and destination nodes to provide them VIFA capabilities.
2. The users sends a VM migration instruction, and the source node VM management program determines whether the local and target nodes have VIFA capabilities. If so, the migration starts, otherwise, the VIFA cancels the migration.
3. The source node VM management program sends a migration request to the target node VM management program.

In some embodiments, the migration request may include a source VM address and a target VM address.

4. The target node VM management program crates a target VM based on the VIFA module.

The VM hot migration process will be described below.

1. When the VIFA driver is initialized, a ring that includes several pieces of entry information will be allocated, and each entry may record the address where the received is to be stored. In this way, after the data is received, the VF device may perform DMA data transmission based on the address of the entry in the ring.
2. The BDU module obtains the ring address information stored in the VF device register through the PF driver. If the VF device is reset, the BDU module will re-initiate the acquisition request.
3. Visit the VIFA to obtain the destination address information of the received data packet.
4. The IAU obtains the abstraction of the underlying hardware device, separates the driver implementation details related to the physical device to obtain the control plane information, designs the resource abstraction structure, stored the control plane information, and facilitates BDU scheduling.
5. The IAU uses virtual resource abstraction to store control plane information in the resource abstraction structure.
6. The hypervisor associates the mapping relationship between the virtual abstraction structure and the VF.
7. Before the migration, the VIFA obtains and stores the VF control configuration information from the VF PCI BAR, and divides PCIe into a part1 (equivalent to the second virtual interface transfer relationship) and a part2 (equivalent to the first virtual interface transfer relationship), where part1 may transmit the data plane information in the virtual machine, and part2 may transmit the relevant control plane information of the virtual machine.
8. Iteratively scan the VM memory, and copy and migration the memory of VM dirty pages.
9. Pause the VM, and save the VM and central processing unit (CPU) state.
10. Transmit the remaining configuration and state information to the destination node and the target virtual machine through the BDU.

In some embodiments, the state information may include state information of CPU registers.

11. After the migration, the target node VIFA restores the VF control configuration information to the new resource abstraction structure.

Figure 12:
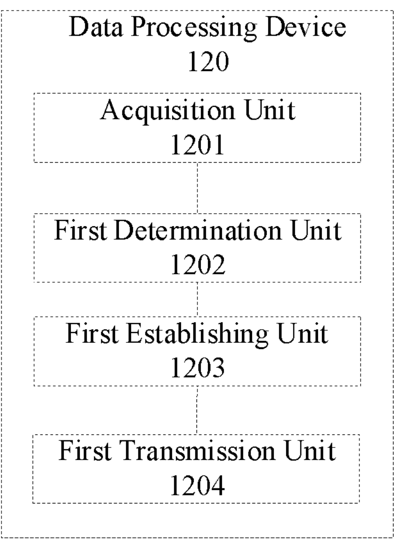
FIG. 12 is a schematic structural diagram of a data processing device according to an embodiment of the present disclosure.

In a second aspect, in order to implement the data processing method described above, an embodiment of the present disclosure provides a data processing device. FIG. 12 is a schematic structural diagram of a data processing device 120 according to an embodiment of the present disclosure.

As shown in FIG. 12, the data processing device 120 is deployed on the source virtual machine, and the source virtual machine includes a first VIFA layer. The data processing device 120 includes an acquisition unit 1201, a first determination unit 1202, a first establishing unit 1203, and a first transmission unit 1204.

In some embodiments, the acquisition unit 1201 may be configured to obtain the target information of the source virtual machine based on the first VIFA layer, the target information including control plane information and data plane information.

In some embodiments, the first determination unit 1202 may be configured to determine that the target virtual machine includes the second VIFA layer.

In some embodiments, the first establishing unit 1203 may be configured to establish the virtual interface transfer relationship between the first VIFA layer and the second VIFA layer.

In some embodiments, the first transmission unit 1204 may be configured to transmit the target information to the target virtual machine based on the virtual interface transfer relationship.

In some embodiments, the first VIFA layer may include a first virtual interface and a second virtual interface, and the second VIFA layer may include a third virtual interface and a fourth virtual interface. The first establishing unit 1203 may be configured to establish a first virtual interface transfer relationship between the first virtual interface and the third virtual interface, and establish a second virtual interface transfer relationship between the second virtual interface and the fourth virtual interface. Correspondingly, the first transmission unit 1204 may be configured to transmit the control plane information to the target virtual machine based on the first virtual interface transfer relationship, and transmit the data plane information to the target virtual machine based on the second virtual interface transfer relationship.

In some embodiments, the acquisition unit 1201 may be configured to search for the first address corresponding to the data plane information in the first address record file of the first VIFA layer, obtain the data plane information based on the first address, determine the first resource abstraction structure corresponding to the control plane information in the first VIFA layer, and obtain the control plane information in the first resource abstraction structure.

In some embodiments, the data processing 120 may also include a pre-processing unit. The pre-processing unit may be configured to separate the target information of the source virtual machine into the control plane information and the data plane information, obtain the first address for storing the data plane information, record the first address in the first address record file, establish the first resource abstraction structure in the first VIFA layer, and store the control plane information in the first resource abstraction structure.

In some embodiments, when the data plane information includes to-be-migrated dirty page memory, based on the first VIFA layer, the acquisition unit 1201 may be further configured to determine the dirty bitmap in the first address record file of the first VIFA layer, the dirty bitmap including at least one dirty page address and a dirty page memory corresponding to each dirty page address in the at least one dirty page address, for each of the dirty page addresses in the at least one dirty page address, determine the dirty page memory corresponding to each of the dirty page addresses, and obtain at least one dirty page memory, and determine that the to-be-migrated dirty page memory is the at least one dirty page memory.

Figure 13:
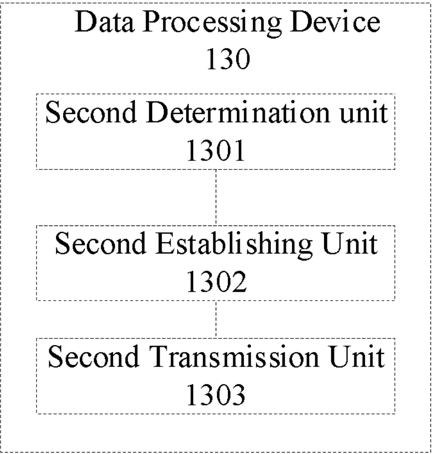
FIG. 13 is a schematic structural diagram of the data processing device according to an embodiment of the present disclosure.

FIG. 13 is a schematic structural diagram of a data processing device 130 according to an embodiment of the present disclosure. As shown in FIG. 13, the data processing device 130 is deployed on the target virtual machine, and the target virtual machine includes the second VIFA layer. The data processing device 130 includes a second determination unit 1301, a second establishing unit 1302, and a second transmission unit 1303.

In some embodiments, the second determination unit 1301 may be configured to determine that the source virtual machine includes the first VIFA layer.

In some embodiments, the second establishing unit 1302 may be configured to establish the virtual interface transfer relationship between the first VIFA layer and the second VIFA layer.

In some embodiments, the second transmission unit 1303 may be configured to receive the target information sent by the source virtual machine based on the virtual interface transfer relationship, the target information including data plane information and control plane information.

In some embodiments, the data processing device 130 may include a configuration unit. The configuration unit may be configured to determine the second address for storing the data plane information, record the second address in the second address record file such that the data plane information can be obtained through the second address, and establish an association relationship between the second resource abstraction structure and the control plane information such that the control plane information can be obtained through the association relationship.

It should be noted that all units included in the data processing device provided by the embodiments of the present disclosure may be implemented through an overall processor of a computing device, and certainly may also be implemented through a specific logic circuit. In different embodiments, the processor may be a central processor (CPU), a microprocessor (MPU), a digital signal processor (DSP), a field programmable gate array (FPGA), or the like.

It should be noted here that the descriptions of the above device embodiments are similar to the description of the above method embodiments. The device embodiments have similar advantageous effects with those of the method embodiments and thus the description thereof will be omitted here. For those technical details not mentioned in the above device embodiments, reference can be made to the description of the above method embodiments and the description thereof will be omitted here for simplicity.

It should be noted that, in the embodiments of the present disclosure, if the above data processing method is realized in the form of software function units and are sold or used as independent products, the display method can be stored in a computer-readable storage medium. On the basis of such an understanding, the technical solution of the present disclosure, in essence, encompasses all or a part of the technical solution which contributes to the conventional technology in the form of software products, which may be stored in a storage medium, including instructions to cause a computer device (a personal computer, a server, a network device, or the like) to execute the entire or a part of method consistent with the disclosure, such as one of the example methods described above. The aforementioned storage medium may include but is not limited to a medium that can store program codes, such as a universal serial bus (USB) flash drive, a read-only memory (ROM), a random-access memory (RAM), a portable hard disk, a magnetic disk or an optical disk. The embodiments of the present disclosure are not limited to any specific combination of hardware and software.

In a third aspect, in order to implement the data processing method described above, an embodiment of the present disclosure provides an electronic device including a processor and a memory. The memory stores a computer program that can be executed by the processor. When the computer program is executed by the processor, the computer program causes the processor to perform data processing method described in the foregoing embodiments.

Figure 14:
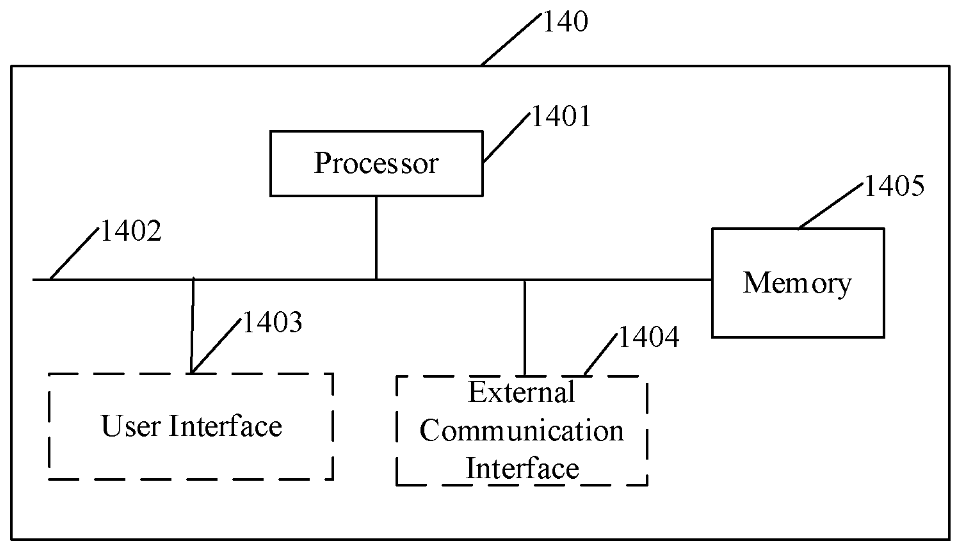
FIG. 14 is a structural block diagram of an electronic device according to an embodiment of the present disclosure.

FIG. 14 is a structural block diagram of an electronic device 140 according to an embodiment of the present disclosure.

In one example, the electronic device 140 may be the electronic device described above. As shown in FIG. 14, the electronic device 140 includes a processor 1401, at least one communication bus 1402, a user interface 1403, at least external communication interface 1404, and a memory 1405. The communication bus 1402 may be configured to enable connection communication between these components. The user interface 1403 may include a display screen. The external communication interface 1404 may include the standard wired interface and wireless interface.

The memory 1405 may be configured to store instructions and applications executable by the processor 1401, and also cache the to-be-processed or processed data (e.g., image data, audio data, voice communication data, and video communication data) processed by the processor 1401 and various modules in the electronic device, which can be implemented by a flash memory or a random-access memory.

In a fourth aspect, an embodiment of the present disclosure provides a storage medium, that is, a computer-readable storage medium having a computer program stored thereon. When the computer program is executed by a processor, the computer program causes the processor to perform the data processing method provided in the foregoing embodiments.

It should be noted here that the descriptions of the above storage medium and electronic device embodiments are similar to the description of the above method embodiments. The storage medium and electronic device embodiments have similar advantageous effects with those of the method embodiments and thus the description thereof will be omitted here. For those technical details not mentioned in the above storage medium and electronic device embodiments, reference can be made to the description of the above method embodiments and the description thereof will be omitted here for simplicity.

It is to be noted that the term "one embodiment" or "an embodiment" as used throughout the description means that the specific features, structures or characteristics associated with the embodiment are included in at least one embodiment of the present disclosure. Hence, the expression "in one embodiment" or "in an embodiment" as used throughout the description does not necessarily refer to the same embodiment. Further, these specific features, structures or characteristics can be arbitrarily combined in one or more embodiments as appropriate. It should be appreciated that, in various embodiments of the present disclosure, the numbering of the above processes does not mean the order in which they are executed. The order in which the processes are executed should be determined by their functions and internal logics, rather than being limited to any embodiment of the present disclosure. The numbering of the above embodiments is used for the purpose of illustration only, but does not imply any preference among those embodiments.

It is to be noted here that the terms "including" or "comprising" or any variants thereof as used herein are not exclusive, such that a process, method, article or apparatus including/comprising a number of elements may also include/comprise other elements that are not explicitly listed or inherent to the process, method, article or apparatus. If not limited otherwise, an element included in process, method, article or apparatus does not exclude a situation where the process, method, article or apparatus including the element further includes one or more identical elements.

It can be appreciated from the embodiments of the present disclosure that the disclosed method and device can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It can be appreciated by those skilled in the art that some or all of the steps in the method embodiments as described above can be implemented by hardware following instructions of a program. Such program can be stored in a computer readable storage medium and, when executed, performs the steps of the above method embodiments. The storage medium may be any of various mediums capable of storing program codes, such as a mobile storage device, a read-only memory (ROM), a random-access Memory (RAM), a magnetic disk or an optical disc.

Alternatively, when the above integrated units of the present disclosure are implemented in software functional modules and sold or used as a standalone product, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium, such as ROM/RAM, magnetic disk, optical disc and the like, containing instructions which cause a computer device (which can be a personal computer, a server, a network device or the like) to perform one or more methods according to the embodiments of the present disclosure or particular parts thereof. The storage medium may be any of various mediums capable of storing program codes, such as a mobile storage device, a ROM, a RAM, a magnetic disk or an optical disc.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims.

What is claimed is:

1. A data processing method applied to a source virtual machine, the source virtual machine including a first virtual interface function abstract (VIFA) layer, the first VIFA layer being a hardware, the method comprising:

obtaining target information of the source virtual machine based on the first VIFA layer, the target information including control plane information and data plane information;

determining that a target virtual machine includes a second VIFA layer, the second VIFA layer being a hardware, the first VIFA layer including a first virtual interface and a second virtual interface different from the first virtual interface, and the second VIFA layer including a third virtual interface and a fourth virtual interface different from the third virtual interface;

establishing a virtual interface transfer relationship between the first VIFA layer and the second VIFA layer, including:

establishing a first virtual interface transfer relationship between the first virtual interface and the third virtual interface, the first virtual interface being configured as a first data output party, and the third virtual interface being configured as a first data receiver corresponding to the first virtual interface;

establishing a second virtual interface transfer relationship between the second virtual interface and the fourth virtual interface, the second virtual interface being configured as a second data output party, and the fourth virtual interface being configured as a second data receiver corresponding to the second virtual interface; and transmitting the target information to the target virtual machine based on the first virtual interface transfer relationship and the second virtual interface transfer relationship;

wherein each of the first VIFA layer and the second VIFA layer includes:

a bus driver unit (BDU) configured to obtain ring address information stored in a virtual function (VF) device register through a page file (PF) driver to obtain entry information, and track a dirty page memory; and an interface abstraction unit (IAU) configured to obtain abstraction of one or more underlying hardware devices, and use a resource abstraction structure to store state information of the one or more underlying hardware devices.

2. The data processing method of claim 1, wherein:

transmitting the target information to the target virtual machine based on the first virtual interface transfer relationship and the second virtual interface transfer relationship includes:

transmitting the control plane information to the target virtual machine based on the first virtual interface transfer relationship; and transmitting the data plane information to the target virtual machine based on the second virtual interface transfer relationship.

3. The data processing method of claim 1, wherein obtaining the target information of the source virtual machine based on the first VIFA layer includes:

searching for a first address corresponding to the data plane information in a first address record file of the first VIFA layer;

obtaining the data plane information based on the first address;

determining a first resource abstraction structure corresponding to the control plane information in the first VIFA layer, the first resource abstraction structure being a data structure; and obtaining the control plane information in the first resource abstraction structure.

4. The data processing method of claim 1, further comprising, before obtaining the target information of the source virtual machine:

separating the target information of the source virtual machine into the control plane information and the data plane information;

obtaining a first address for storing the data plane information;

recording the first address in the first address record file;

establishing a first resource abstraction structure in the first VIFA layer, the first resource abstraction structure being a data structure; and storing the control plane information in the first resource abstraction structure.

5. The data processing method of claim 1, wherein when the data plane information includes a to-be-migrated dirty page memory, obtaining the target information of the source virtual machine based on the first VIFA layer includes:

determining a dirty bitmap in a first address record file of the first VIFA layer, the dirty bitmap including at least one dirty page address and the dirty page memory corresponding to each of the dirty page addresses in the at least one dirty page address;

for each of the dirty page addresses in the at least one dirty page address, determining the dirty page memory corresponding to each of the dirty page addresses to obtain at least one dirty page memory; and determining that the to-be-migrated dirty page memory is the at least one dirty page memory.

6. A data processing method applied to a target virtual machine, the target virtual machine including a second VIFA layer, the second VIFA layer being a hardware, the method comprising:

determining that a source virtual machine includes a first VIFA layer, the first VIFA layer being a hardware, the first VIFA layer including a first virtual interface and a second virtual interface different from the first virtual interface, and the second VIFA layer including a third virtual interface and a fourth virtual interface different from the third virtual interface;

establishing a virtual interface transfer relationship between the first VIFA layer and the second VIFA layer, including:

establishing a first virtual interface transfer relationship between the first virtual interface and the third virtual interface, the first virtual interface being configured as a first data output party, and the third virtual interface being configured as a first data receiver corresponding to the first virtual interface;

establishing a second virtual interface transfer relationship between the second virtual interface and the fourth virtual interface, the second virtual interface being configured as a second data output party, and the fourth virtual interface being configured as a second data receiver corresponding to the second virtual interface; and receiving target information sent by the source virtual machine based on the first virtual interface transfer relationship and the second virtual interface transfer relationship, the target information including data plane information and control plane information;

wherein each of the first VIFA layer and the second VIFA layer includes:

a bus driver unit (BDU) configured to obtain ring address information stored in a virtual function (VF) device register through a page file (PF) driver to obtain entry information, and track a dirty page memory; and an interface abstraction unit (IAU) configured to obtain abstraction of one or more underlying hardware devices, and use a resource abstraction structure to store state information of the one or more underlying hardware devices.

7. The data processing method of claim 6, wherein the second VIFA layer further includes a second address record file and a second resource abstraction structure, the second resource abstraction structure being a data structure, the method further comprising:

determining a second address for storing the data plane information; and recording the second address in the second address record file for obtaining the data plane information through the second address; and establishing an association relationship between the second resource abstraction structure and the control plane information for obtaining the control plane information through the association relationship.

8. A data processing device deployed in a source virtual machine, the source virtual machine including a first virtual interface function abstract (VIFA) layer, the first VIFA layer being a hardware, the device comprising:

an acquisition unit, configured to obtain target information of the source virtual machine based on the first VIFA layer, the target information including control plane information and data plane information;

a first determination unit, configured to determine that a target virtual machine includes a second VIFA layer, the second VIFA layer being a hardware, the first VIFA layer including a first virtual interface and a second virtual interface different from the first virtual interface, and the second VIFA layer including a third virtual interface and a fourth virtual interface different from the third virtual interface;

a first establishing unit, configured to establish a virtual interface transfer relationship between the first VIFA layer and the second VIFA layer, including:

establishing a first virtual interface transfer relationship between the first virtual interface and the third virtual interface, the first virtual interface being configured as a first data output party, and the third virtual interface being configured as a first data receiver corresponding to the first virtual interface;

establishing a second virtual interface transfer relationship between the second virtual interface and the fourth virtual interface, the second virtual interface being configured as a second data output party, and the fourth virtual interface being configured as a second data receiver corresponding to the second virtual interface; and a first transmission unit, configured to transmit the target information to the target virtual machine based on the first virtual interface transfer relationship and the second virtual interface transfer relationship;

wherein each of the first VIFA layer and the second VIFA layer includes:

a bus driver unit (BDU) configured to obtain ring address information stored in a virtual function (VF) device register through a page file (PF) driver to obtain entry information, and track a dirty page memory; and an interface abstraction unit (IAU) configured to obtain abstraction of one or more underlying hardware devices, and use a resource abstraction structure to store state information of the one or more underlying hardware devices.

9. The data processing device of claim 8, wherein:

the first transmission unit is further configured to:

transmit the control plane information to the target virtual machine based on the first virtual interface transfer relationship; and transmit the data plane information to the target virtual machine based on the second virtual interface transfer relationship.

10. The data processing device of claim 8, wherein the first acquisition unit is further configured to:

search for a first address corresponding to the data plane information in a first address record file of the first VIFA layer;

obtain the data plane information based on the first address;

determine a first resource abstraction structure corresponding to the control plane information in the first VIFA layer, the first resource abstraction structure being a data structure; and obtain the control plane information in the first resource abstraction structure.

11. The data processing device of claim 8, further comprising:

a pre-processing unit, configured to:

separate the target information of the source virtual machine into the control plane information and the data plane information;

obtain a first address for storing the data plane information;

record the first address in the first address record file;

establish a first resource abstraction structure in the first VIFA layer, the first resource abstraction structure being a data structure; and store the control plane information in the first resource abstraction structure.

12. The data processing device of claim 8, wherein when the data plane information includes a to-be-migrated dirty page memory, the acquisition unit is further configured to:

determine a dirty bitmap in a first address record file of the first VIFA layer, the dirty bitmap including at least one dirty page address and the dirty page memory corresponding to each of the dirty page addresses in the at least one dirty page address;

for each of the dirty page addresses in the at least one dirty page address, determine the dirty page memory corresponding to each of the dirty page addresses to obtain at least one dirty page memory; and determine that the to-be-migrated dirty page memory is the at least one dirty page memory.

13. An electronic device comprising:

a one processor; and a memory storing a computer program that, when executed, causes the processor to:

obtain target information of a source virtual machine based on a first virtual interface function abstract (VIFA) layer, the first VIFA layer being a hardware, the target information including control plane information and data plane information;

determine that a target virtual machine includes a second VIFA layer, the second VIFA layer being a hardware, the first VIFA layer including a first virtual interface and a second virtual interface different from the first virtual interface, and the second VIFA layer including a third virtual interface and a fourth virtual interface different from the third virtual interface;

establish a virtual interface transfer relationship between the first VIFA layer and the second VIFA layer, including:

establishing a first virtual interface transfer relationship between the first virtual interface and the third virtual interface, the first virtual interface being configured as a first data output party, and the third virtual interface being configured as a first data receiver corresponding to the first virtual interface;

establishing a second virtual interface transfer relationship between the second virtual interface and the fourth virtual interface, the second virtual interface being configured as a second data output party, and the fourth virtual interface being configured as a second data receiver corresponding to the second virtual interface; and transmit the target information to the target virtual machine based on the first virtual interface transfer relationship and the second virtual interface transfer relationship;

wherein each of the first VIFA layer and the second VIFA layer includes:

a bus driver unit (BDU) configured to obtain ring address information stored in a virtual function (VF) device register through a page file (PF) driver to obtain entry information, and track a dirty page memory; and an interface abstraction unit (IAU) configured to obtain abstraction of one or more underlying hardware devices, and use a resource abstraction structure to store state information of the one or more underlying hardware devices.

14. The electronic device of claim 13, wherein:

the computer program further causes the processor to:

transmit the control plane information to the target virtual machine based on the first virtual interface transfer relationship; and transmit the data plane information to the target virtual machine based on the second virtual interface transfer relationship.

15. The electronic device of claim 13, wherein the computer program further causes the processor to:

search for a first address corresponding to the data plane information in a first address record file of the first VIFA layer;

obtain the data plane information based on the first address;

determine a first resource abstraction structure corresponding to the control plane information in the first VIFA layer, the first resource abstraction structure being a data structure; and obtain the control plane information in the first resource abstraction structure.

16. The electronic device of claim 13, wherein before obtaining the target information of the source virtual machine, the computer program further causes the processor to:

separate the target information of the source virtual machine into the control plane information and the data plane information;

obtain a first address for storing the data plane information;

record the first address in the first address record file;

establish a first resource abstraction structure in the first VIFA layer, the first resource abstraction structure being a data structure; and store the control plane information in the first resource abstraction structure.

17. The electronic device of claim 13, wherein when the data plane information includes a to-be-migrated dirty page memory, the computer program further causes the processor to:

determine a dirty bitmap in a first address record file of the first VIFA layer, the dirty bitmap including at least one dirty page address and the dirty page memory corresponding to each of the dirty page addresses in the at least one dirty page address;

for each of the dirty page addresses in the at least one dirty page address, determine the dirty page memory corresponding to each of the dirty page addresses to obtain at least one dirty page memory; and determine that the to-be-migrated dirty page memory is the at least one dirty page memory.

18. The data processing method of claim 2, wherein the control plane information includes configuration information and state information of the source virtual machine, and the data plane information includes a dirty page memory.

19. The data processing method of claim 1, wherein each of the first virtual interface, the second virtual interface, the third virtual interface, and the fourth virtual interface is a high-speed serial computer expansion bus ( ) type of virtual interface.

* * * * *